(12) United States Patent
Lim

(10) Patent No.: US 8,932,749 B2
(45) Date of Patent: Jan. 13, 2015

(54) BATTERY MODULE

(75) Inventor: Young-Bin Lim, Yongin-si (KR)

(73) Assignees: Samsung SDI Co., Ltd., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 458 days.

(21) Appl. No.: 13/200,346

(22) Filed: Sep. 23, 2011

(65) Prior Publication Data
US 2013/0022859 A1   Jan. 24, 2013

(30) Foreign Application Priority Data

Jul. 22, 2011 (KR) .................. 10-2011-0073108

(51) Int. Cl.
| | |
|---|---|
| H01M 6/42 | (2006.01) |
| H01M 10/0525 | (2010.01) |
| H01M 2/10 | (2006.01) |
| H01M 10/0585 | (2010.01) |

(52) U.S. Cl.
CPC ........ H01M 10/0525 (2013.01); H01M 2/1061 (2013.01); H01M 10/0585 (2013.01); *Y02E 60/122* (2013.01); *Y02T 10/7011* (2013.01)
USPC .............. 429/159; 429/99; 429/120; 429/185

(58) Field of Classification Search
CPC ... H01M 2/10; H01M 2/1005; H01M 2/1016; H01M 10/04; H01M 2/1072; H01M 2/1205; H01M 10/5004; H01M 10/5016; H01M 10/503; H01M 10/5073; H01M 6/42; H01M 10/5038; H01M 10/5067; B60L 11/1874; B60L 11/1879; B60L 11/1877; B60L 2260/56; Y02T 10/705; Y02T 10/7005; Y02T 10/7011; Y02E 60/12
USPC .................................... 429/159, 99, 120, 185
See application file for complete search history.

(56) References Cited

U.S. PATENT DOCUMENTS

| | | | |
|---|---|---|---|
| 2006/0251960 A1 | 11/2006 | Yoon et al. | |
| 2009/0274952 A1* | 11/2009 | Wood et al. | ..................... 429/99 |
| 2011/0027630 A1 | 2/2011 | Tsutsumi et al. | |

FOREIGN PATENT DOCUMENTS

| | | |
|---|---|---|
| JP | 2006-140023 A | 6/2006 |
| KR | 10-0214996 B1 | 5/1999 |
| KR | 10-2006-0110580 | 10/2006 |
| KR | 10-2008-0027504 | 3/2008 |
| KR | 10-2010-0123906 A | 11/2010 |

OTHER PUBLICATIONS

Korean Office Action dated Oct. 29, 2012.
Korean Notice of Allowance dated May 20, 2013.

* cited by examiner

*Primary Examiner* — Gary Harris
(74) *Attorney, Agent, or Firm* — Lee & Morse, P.C.

(57) ABSTRACT

A battery module includes one or more battery cells aligned in one direction, a housing member that accommodates the battery cells, and is opposite to a whole of at least one surface of the battery cells; and a top cover that is connected and fastened to at least one portion of the housing member, and covers tops of the battery cells.

18 Claims, 8 Drawing Sheets

BATTERY MODULE

BACKGROUND

1. Field

Embodiments relate to a battery module capable of improving impact resistance.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

SUMMARY

According to an embodiment, there is provided a battery module including one or more battery cells aligned in one direction, a housing member that accommodates the battery cells, and is opposite to a whole of at least one surface of the battery cells, and a top cover that is connected and fastened to at least one portion of the housing member, and covers tops of the battery cells.

The battery cells may be prismatic. The housing member may include a pair of end plates respectively in surface contact with outermost battery cells among the battery cells, a pair of side plates between the pair of end plates, and a bottom plate between the pair of side plates and facing bottoms of the battery cells.

At least one of the pair of side plates may include at least one first fastening portion fastened to the top cover, at least one second fastening portion fastened to at least one of the pair of end plates, and at least one third fastening portion fastened to the bottom plate.

The at least one of the pair of side plates may include first, second and third fastening holes respectively located in the first, second and third fastening portions.

The bottom plate may include at least one first fastening portion fastened to at least one of the pair of side plates, and at least one second fastening portion fastened to at least one of the pair of end plates.

The bottom plate may include first and second fastening holes respectively located in the first and second fastening portions.

The top cover may include at least one first fastening portion fastened to at least one of the pair of side plates and at least one second fastening portion fastened to at least one of the pair of end plates.

The top cover may include first and second fastening holes respectively located in the first and second fastening portions.

At least one of the pair of end plates includes at least one first fastening portion fastened to the top cover, at least one second fastening portion fastened to at least one of the pair of side plates, and at least one third fastening portion fastened to the bottom plate.

The at least one of the pair of end plates may include first, second and third fastening holes respectively located in the first, second and third fastening portions.

The pair of side plates and the bottom plate may be integrally formed.

The pair of side plates, the bottom plate and the pair of end plates may be integrally formed.

A degassing portion corresponding to vent regions of the battery cells may be further provided at a position corresponding to at least one portion of the top cover.

The top cover may include at least one first fastening portion fastened to at least one of the pair of side plates, at least one second fastening portion fastened to at least one of the pair of end plates, and at least one degassing fastening portion fastened to the degassing portion.

The top cover may include a first fastening hole, a second fastening hole and a degassing fastening hole, respectively formed in the first fastening portion, the second fastening portion and the degassing fastening portion.

The at least one of the pair of end plates may include at least one fastening portion fastened to the top cover.

The at least one of the pair of end plates may include a fastening hole formed in the fastening portion.

The pair of side plates, the bottom plate, the top cover and the pair of end plates forming the housing member may be fastened with fastening members or through welding.

The fastening member may be a bolt-nut or stud.

At least one opening may be provided to the side plate.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
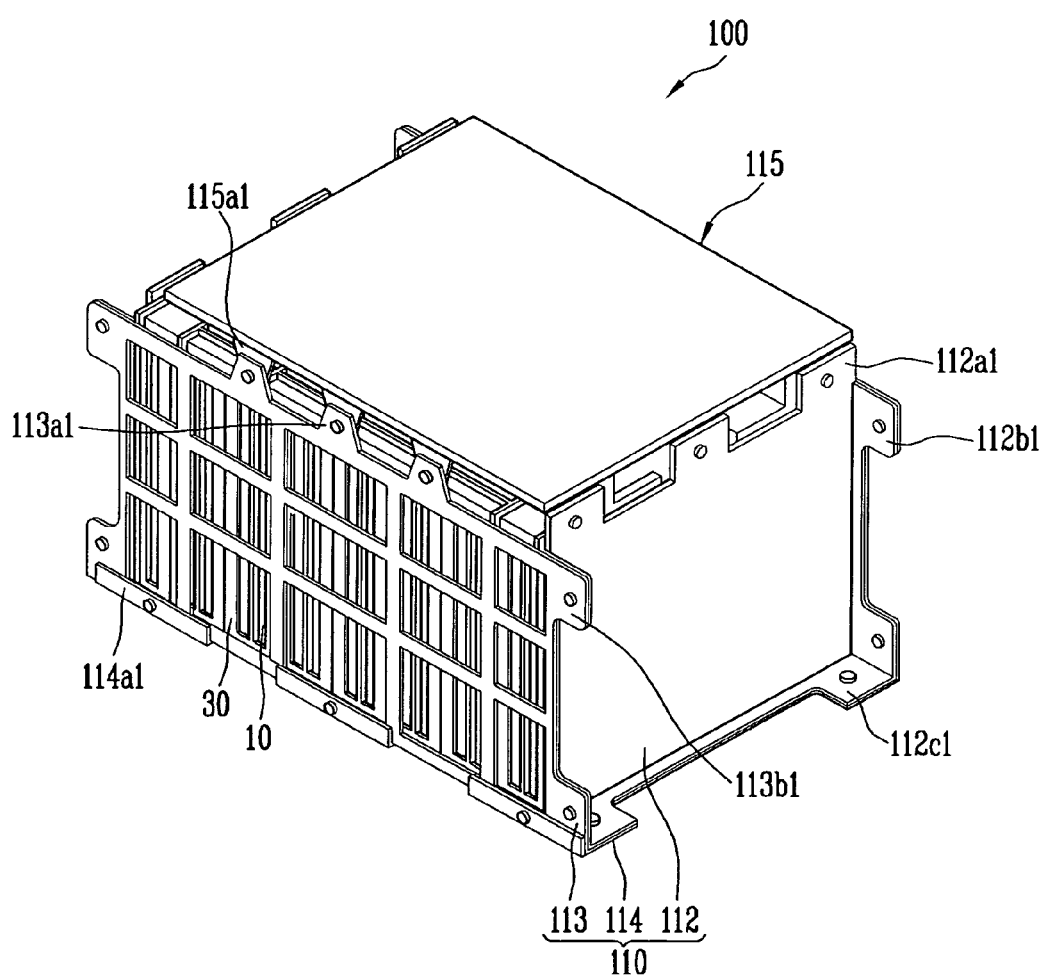
FIG. 1 illustrates a perspective view schematically showing a battery module according to an embodiment.

Korean Patent Application No. 10-2011-0073108, filed on Jul. 22, 2011, in the Korean Intellectual Property Office, and entitled: "Battery Module" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Spatially descriptive terms, such as "top," "bottom," "side," "end," and the like, may be used herein for ease of description to describe one element or feature relationship to another element(s) or feature(s) as illustrated in the figures. It will be understood that the spatially descriptive terms are intended to encompass different orientations of the device in use or operation in addition to the orientation depicted in the figures. For example, if the battery module in the figures were to be turned over (or upside down), elements or layers described as "top" would then be oriented below the other elements or layers. Thus, the battery module may be otherwise oriented (rotated 90 degrees or at other orientations) and the spatially descriptive terms used herein may be interpreted accordingly.

Hereinafter, embodiments will be described with FIGS. 1 to 8.

Battery modules 100, 200, 300 and 400 according to embodiments may include at least one battery cell 10 aligned in one direction; housing members 110, 220, 330 and 440 that accommodate the battery cells 10 and are opposite to the whole of at least one surface of the battery cells 10; and top covers 115, 215, 315 and 415 that are fastened and coupled to at least one portion of the housing members 110, 220, 330 and 440, and which cover tops of the battery cells 10, respectively.

Here, the housing members 110, 220, 330 and 440 may include pairs of end plates 112, 212, 312 and 412 disposed to come into surface contact with outermost battery cells 10 among the battery cells 10; pairs of side plates 113, 213, 313 and 413 having at least one portions disposed between the pairs of the end plates 112, 212, 312 or 412; and bottom plates 114, 214, 314 and 414 connected to the pairs of the side plates 113, 213, 313 and 413, and disposed opposite to bottoms of the battery cells 10, respectively.

A battery module according to an embodiment will be described with reference to FIGS. 1 and 2.

Figure 2:
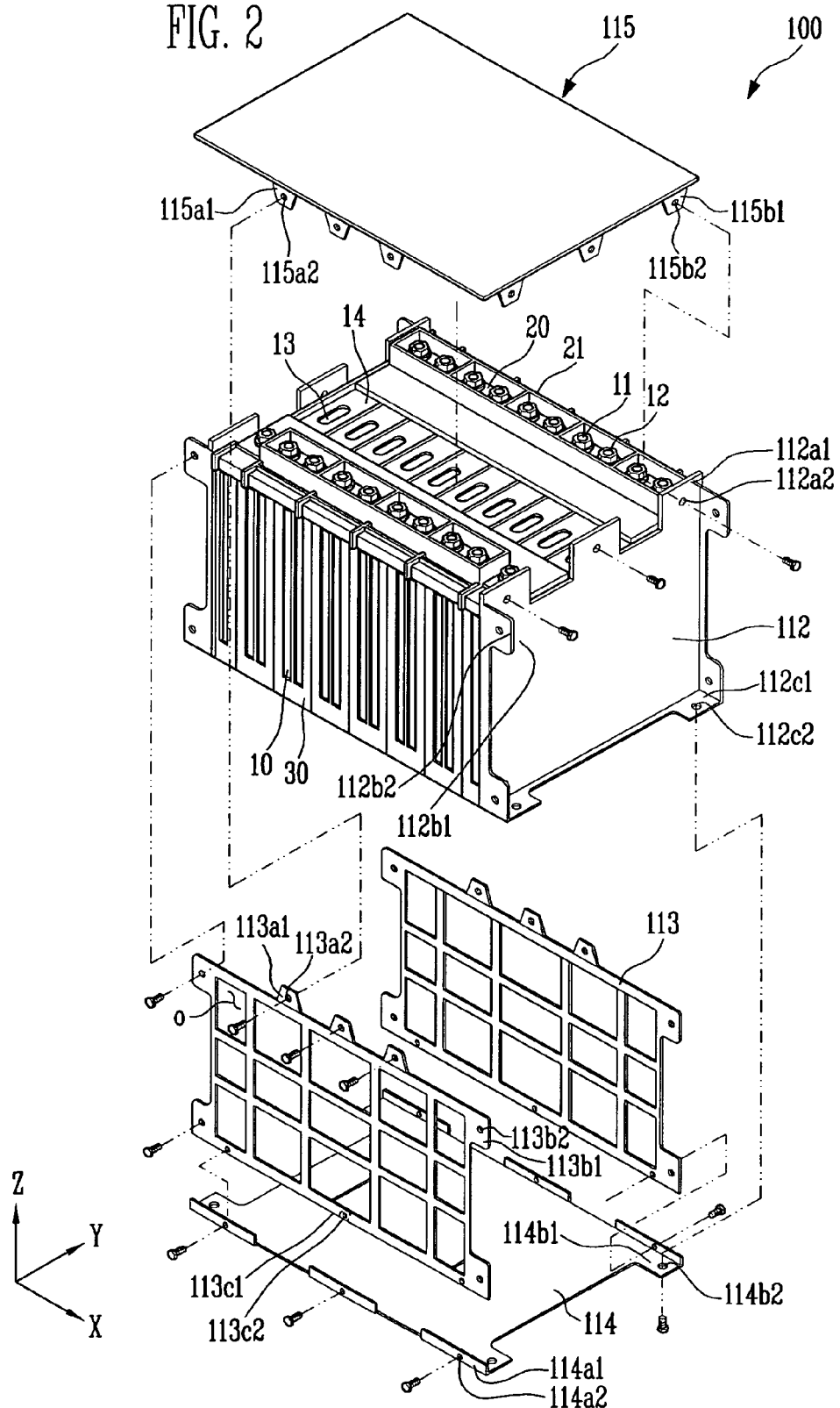
FIG. 2 illustrates an exploded perspective view of FIG. 1.

FIG. 1 illustrates a perspective view schematically showing a battery module according to an embodiment. FIG. 2 illustrates an exploded perspective view of FIG. 1.

The battery module 100 according to this embodiment may include a plurality of battery cells 10 that are aligned in one direction, each battery cell 10 having electrode terminals 11 and 12. The battery cells 10 may be, for example, prismatic battery cells. The battery cells 10 may be aligned so that wide surfaces of neighboring battery cells 10 are opposite to each other.

Each of the battery cells 10 that constitute the battery module 100 may be manufactured by accommodating an electrode assembly and an electrolyte in a battery case and then sealing the battery case that accommodates the electrode assembly using a cap plate 14. The electrode assembly may include a positive electrode, a negative electrode and a separator interposed between the positive and negative electrodes. The electrode terminals 11 and 12 may include a positive electrode terminal 11 connected to the positive electrode and a negative electrode terminal 12 connected to the negative electrode. The positive and negative electrode terminals 11 and 12 may protrude outward from the cap plate 14. The positive and negative electrodes may generate electrochemical energy through a reaction between the electrolyte and the electrodes, and the generated energy may be transferred to the outside of the battery cell 10 through the positive and negative electrode terminals 11 and 12. A vent 13 may be provided between the positive and negative electrode terminals 11 and 12 so as to act as a path for exhausting gas.

In this embodiment, a prismatic lithium ion secondary battery is described as an example of the battery cell 10. However, various types of batteries such as a lithium polymer battery and a cylindrical battery may also be used.

In this embodiment, a housing member 110 may include a pair of end plates 112 respectively disposed to come into surface contact with outermost battery cells 10 among the battery cells 10, and a pair of side plates 113 and a bottom plate 114 disposed between the pair of end plates 112. In an implementation, the side plates 113, the bottom plate 114 and the end plate 112 may be metal.

The pair of side plates 113 may be disposed between the pair of end plates 112, and the bottom plate 114 may be connected and fastened to the pair of side plates 113 so as to face bottoms of the battery cells 10. It is to be understood that although the following descriptions may sometimes refer to a singular side plate 113 and a singular end plate 112 for convenience, such descriptions may apply to both of the pair of side plates 113 and both of the pair of end plates 112.

The side plate 113 may have at least one first fastening portion 113a1 fastened to a top cover 115, at least one second fastening portion 113b1 fastened to the end plate 112, and at least one third fastening portion 113c1 fastened to the bottom plate 114. The side plate 113 also may have first, second and third fastening holes 113a2, 113b2 and 113c2 respectively formed in the first, second and third fastening portions 113a1, 113b1 and 113c1.

The bottom plate 114 may have at least one first fastening portion 114a1 fastened to the side plate 113, and at least one second fastening portion 114b1 fastened to the end plate 112. The bottom plate 114 also may have first and second fastening holes 114a2 and 114b2 respectively formed in the first and second fastening portions 114a1 and 114b1.

The top cover 115 may have at least at least one first fastening portion 115a1 fastened to the side plate 113, and at least one second fastening portion 115b1 fastened to the end plate 112. The top cover 115 also may have first and second fastening holes 115a2 and 115b2 respectively formed in the first and second fastening portions 115a1 and 115b1.

The end plate 112 may have at least one first fastening portion 112a1 fastened to the top cover 115, at least one second fastening portion 112b1 fastened to the side plate 113, and at least one third fastening portion 112c1 fasted to the bottom plate 114. The end plate 112 also may have first, second and third fastening holes 112a2, 112b2 and 112c2 respectively formed in the first, second and third fastening portions 112a1, 112b1 and 112c1.

The first and second end plates 112 may be disposed to come into surface contact with the respective outermost battery cells 10, so that the plurality of battery cells 10 can be pressed inwardly by the first and second plates 112. The side plate 113 may connect the first and second end plates 112 to each other. One end of the side plate 113 may be fastened to the first end plate 112, and the other end of the side plate 113 may be fastened to the second end plate 112. In this instance, the first and second end plates 112 and the side plate 113 may be fastened to each other through the medium of a fastening member such as a bolt-nut or stud or through welding.

The side plates 113 may connect the first and second end plates 112 to each other, so as to provide a space in which the plurality of battery cells 10 can be aligned and to support both sides of the battery cells 10 at the same time. Referring to FIG. 2, it is shown in this embodiment that the side plates 113 support both the sides of the battery cells 10 and have openings formed therein for a coolant flow path, but the shape of the side plate 113 may be implemented in various shapes. The battery cells 10 may be fixed in the space partitioned by the first and second end plates 112 and the side plates 113 so as not to be easily moved by an external impact.

Barriers 30 may be interposed between respective ones of the battery cells. A spacer (not shown) may be provided to each of the barriers 30, so as to space apart neighboring battery cells 10 from each other and to provide a moving path of a coolant for cooling the battery cells 10 by forming a space between the battery cells 10.

A bus-bar 20 that connects the electrode terminals 11 and 12 of adjacent battery cells 10 to each other and a blocking wall 21 surrounding adjacent bus-bars 21 may be further provided to the battery module 100.

The blocking wall 21 may partition a plurality of bus-bars 20 that electrically connect the electrode terminals 11 and 12 provided to the battery cells 10, so as to prevent a short circuit between adjacent bus-bars 20 and to prevent a short circuit caused by an electric conductor made of metal such as a bolt-nut, which is a material used in the battery module 100.

In this embodiment, all the fastening portions 113a1, 113b1, 113c1, 114a1, 114b1, 115a1, 115b1, 112a1, 112b1 and 112c1 and the fastening holes 113a2, 113b2, 113c2, 114a2, 114b2, 115a2, 115b2, 112a2, 112b2, 112c2 may be fastened by fastening members such as bolts-nuts or studs. If desired, all the fastening portions and holes may be fastened through welding.

In the battery module 100 according to this embodiment, the housing member 110 formed by fastening the pair of side plates 113, the pair of end plates 112, and the bottom plate 114 may be directly connected and fastened to the top cover 115. The battery cells 10 constituting the battery module 100 may remain firmly fixed in the event of an impact, regardless of the direction from which the impact is applied.

Particularly, it may be possible to provide the battery module 100 having improved impact resistance by overcoming a structural weakness of a typical battery module, which may be weak against an impact applied in the z-axis direction perpendicular to the ground.

Hereinafter, a battery module according to another embodiment will be described based on differences from the aforementioned embodiment with reference to FIGS. 3 and 4.

Figure 3:
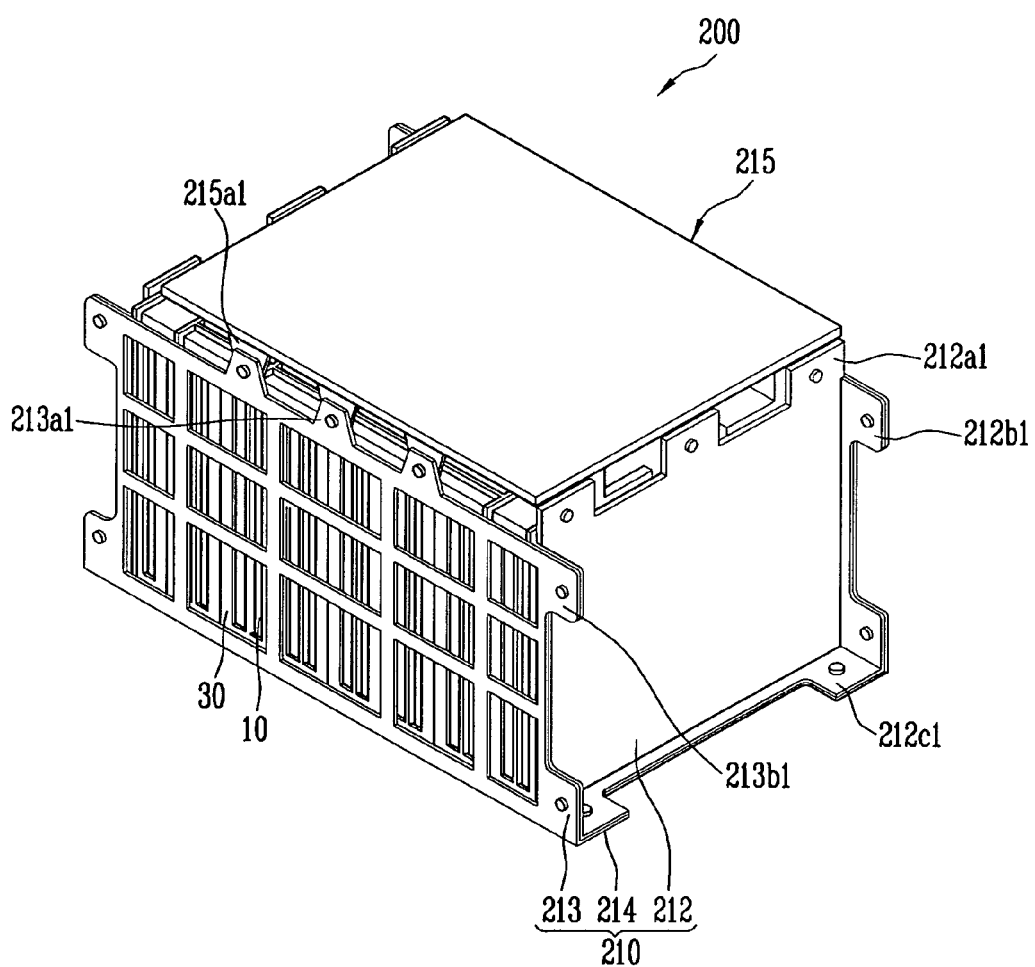
FIG. 3 illustrates a perspective view schematically showing a battery module according to another embodiment.

FIG. 3 illustrates a perspective view schematically showing a battery module according to another embodiment. FIG. 4 illustrates an exploded perspective view of FIG. 3.

Figure 4:
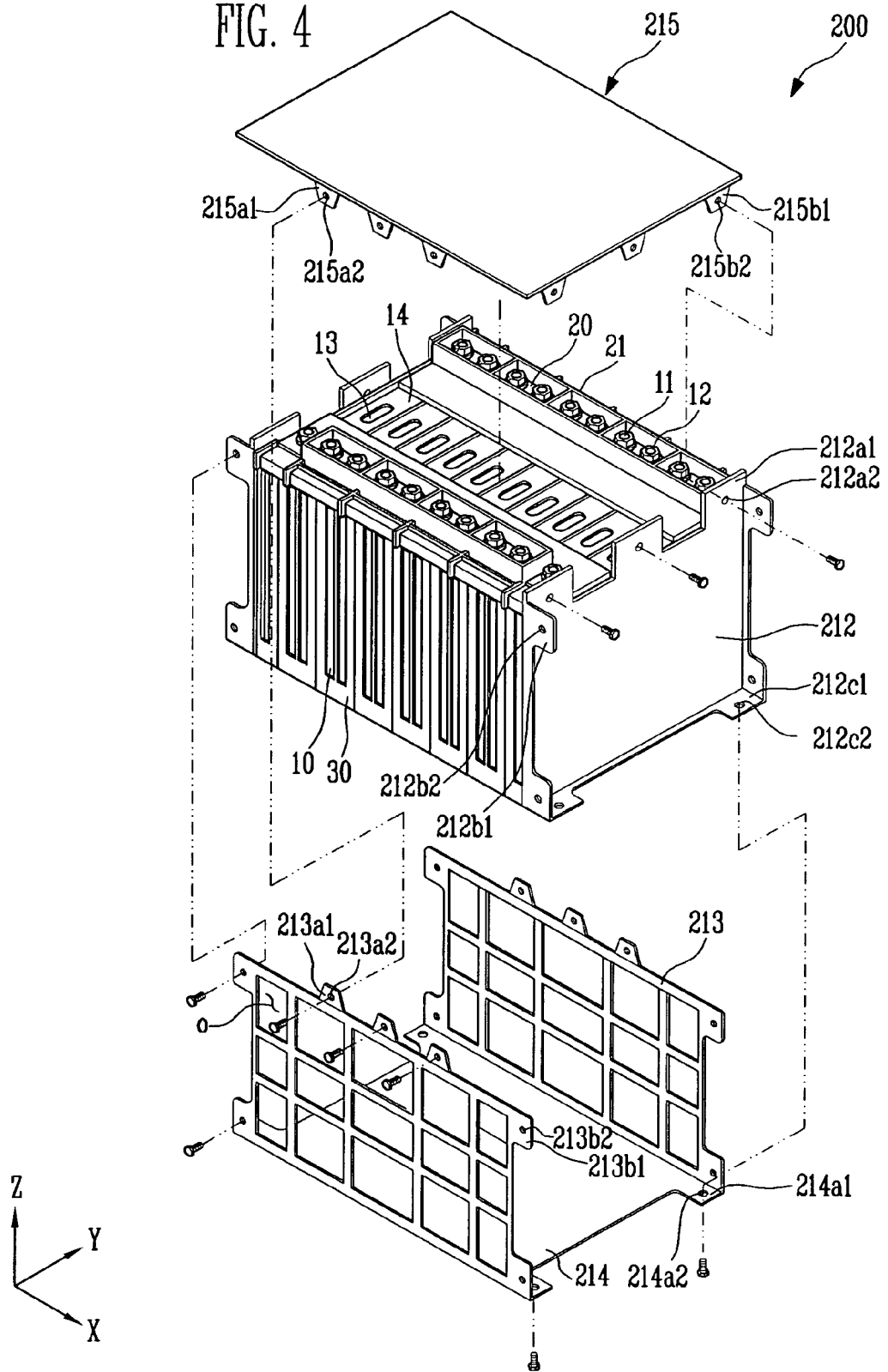
FIG. 4 illustrates an exploded perspective view of FIG. 3.

Referring to FIGS. 3 and 4, a housing member 210 according to this embodiment may include a pair of end plates 212 respectively disposed to come into surface contact with outermost battery cells 10 among the battery cells 10, and a pair of side plates 213 and a bottom plate 214, disposed between the pair of end plates 212. The pair of side plates 213 may be disposed between the pair of end plates 212, and the bottom plate 214 may be integrally connected to the pair of side plates 213 so as to face bottoms of the battery cells 10. It is to be understood that although the following descriptions may sometimes refer to a singular side plate 213 and a singular end plate 212 for convenience, such descriptions may apply to both of the pair of side plates 213 and both of the pair of end plates 212.

The side plate 213 may have at least one first fastening portion 213a1 fastened to a top cover 215, and at least one second fastening portion 213b1 fastened to the end plate 212. The side plate 213 also may have first and second fastening holes 213a2 and 213b2 respectively formed in the first and second fastening portions 213a1 and 213b1. The side plates 213 may be integrally connected to the bottom plate 214. Separate fastening portions and fastening holes of the side plate 213 connected to the bottom plate 214 may be omitted.

The bottom plate 214 may have at least one fastening portion 214a1 fastened to the end plate 212. The bottom plate 214 also may have a fastening hole 214a2 formed in the fastening portion 214a1. The bottom plate 214 may be integrally connected to the side plates 213. Separate fastening portions and fastening holes of the bottom plate 214 connected to the side plates 213 may be omitted.

The top cover 215 may have at least one first fastening portion 215a1 fastened to the side plate 213, and at least one second fastening portion 215b1 fastened to the end plate 212. The top cover 215 also may have first and second fastening holes 215a2 and 215b2 respectively formed in the first and second fastening portions 215a1 and 215a2.

The end plate 212 may have at least one first fastening portion 212a1 fastened to the top cover 215, at least one second fastening portion 212b1 fastened to the side plate 213, and at least one third fastening portion 212c1 fasted to the bottom plate 214. The end plate 212 also may have first, second and third fastening holes 212a2, 212b2 and 212c2 respectively formed in the first, second and third fastening portions 212a1, 212b1 and 212c1.

In this embodiment, all the fastening portions 213a1, 213b1, 214a1, 215a1, 215b1, 212a1, 212b1 and 212c1 and the fastening holes 213a2, 213b2, 214a2, 215a2, 215b2, 212a2, 212b2, 212c2 may be fastened by fastening members such as bolts-nuts or studs. If desired, all the fastening portions and holes may be fastened through welding.

An opening may be provided to the side plate 213 so as to act as a path for cooling the battery cells 10.

In the battery module 200 according to this embodiment, the housing member 210 formed by fastening the integrally formed pair of the side plates 213 and the bottom plate 214 and the end plates 212 may be directly connected and fastened to the top cover 215. The battery cells 10 constituting the battery module 200 may remain firmly fixed in the event of an impact, regardless of the direction from which the impact is applied. Particularly, it may be possible to provide the battery module 200 having improved impact resistance by overcoming a structural weakness of a typical battery module, in which the typical battery module may be weak against an impact applied in the z-axis direction perpendicular to the ground.

Hereinafter, a battery module according to still another embodiment will be described based on differences from the aforementioned embodiments with reference to FIGS. 5 and 6.

Figure 5:
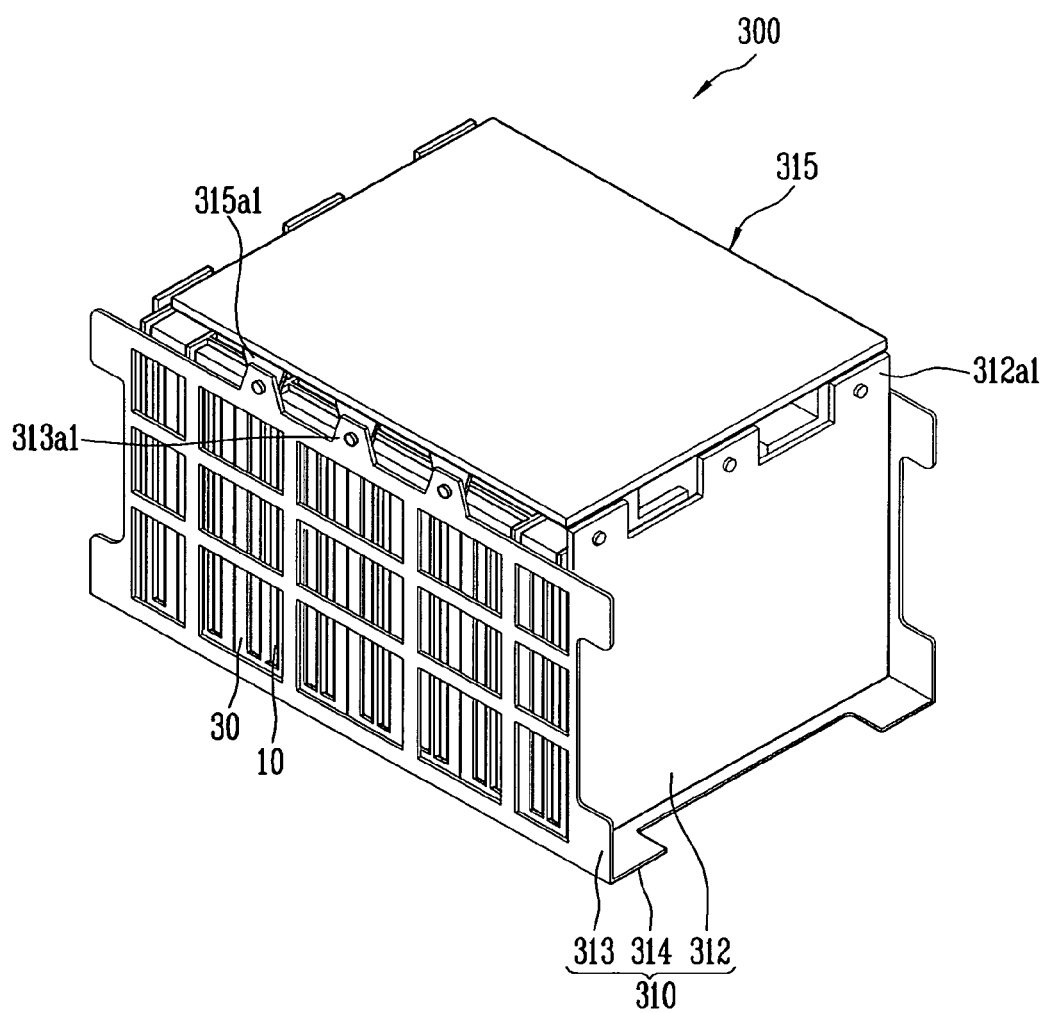
FIG. 5 illustrates a perspective view schematically showing a battery module according to still another embodiment.

FIG. 5 illustrates a perspective view schematically showing a battery module according to still another embodiment. FIG. 6 illustrates an exploded perspective view of FIG. 5.

Figure 6:
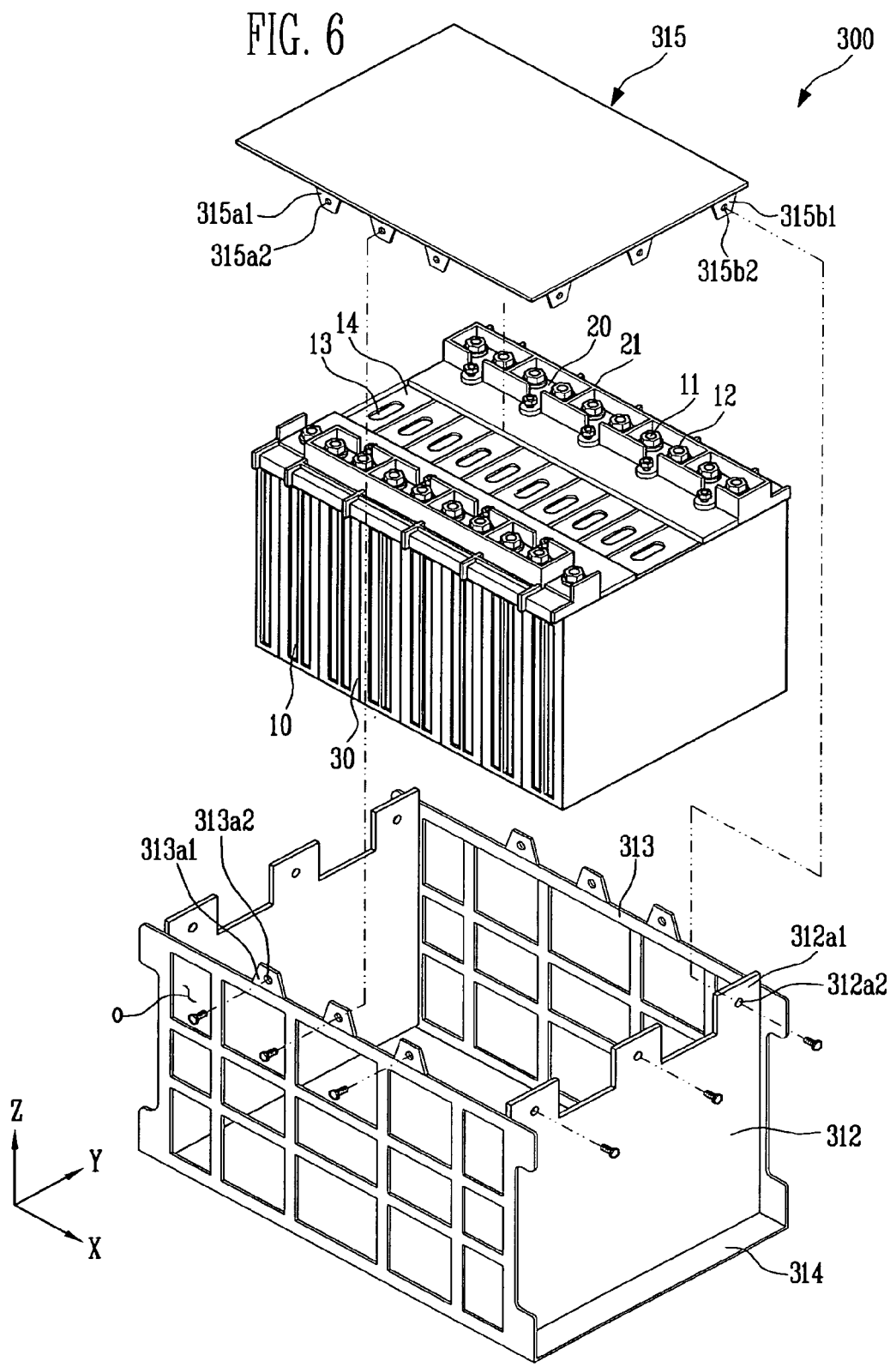
FIG. 6 illustrates an exploded perspective view of FIG. 5.

Referring to FIGS. 5 and 6, a housing member 310 according to this embodiment may include a pair of end plates 312 respectively disposed to come into surface contact with outermost battery cells 10 among the battery cells 10 and a pair of side plates 313 and a bottom plate 314 disposed between the pair of end plates 312. The pair of side plates 313 may be disposed between the pair of end plates 312. The bottom plate 314 may be integrally connected to the pair of side plates 313 so as to face bottoms of the battery cells 10. It is to be understood that although the following descriptions may sometimes refer to a singular side plate 313 and a singular end plate 312 for convenience, such descriptions may apply to both of the pair of side plates 213 and both of the pair of end plates 212.

The side plate 313 may have at least one fastening portion 313a1 fastened to a top cover 315. The side plate 313 also may have a fastening hole 313a2 formed in the fastening portion 313a1. The side plates 313 may be integrally connected to the end plates 312 and the bottom plate 314. Separate fastening portions and fastening holes of the side plate 313 connected to the end plates 314 and the bottom plate 314 may be omitted.

Since the bottom plate 314 may be integrally connected to the side plates 313 and the end plates 312, separate fastening portions and fastening holes may be omitted.

The top cover 315 may have at least one first fastening portion 315a1 fastened to the side plate 313, and at least one second fastening portion 315b1 fastened to the end plate 312. The top cover 315 also may have first and second fastening holes 315a2 and 315b2 respectively formed in the first and second fastening portions 315a1 and 315a2.

The end plate 312 may have at least one fastening portion 312a1 fastened to the top cover 315. The end plate 312 also may have a fastening hole 312a2 formed in the fastening portion 312a1. The end plates 312 may be integrally connected to the side plates 313 and the end plates 312. Separate fastening portions and fastening holes of the end plates 312 connected to the side plates 313 and the bottom plate 314 may be omitted.

In this embodiment, all the fastening portions 313a1, 315a1, 315b1 and 312a1 and the fastening holes 313a2, 315a2, 315b2 and 312a2 may be fastened by fastening members such as bolts-nuts or studs. If desired, all the fastening portions and holes may be fastened through welding.

An opening may be provided to the side plate 313 so as to act as a path for cooling the battery cells 10.

In the battery module 300 according to this embodiment, the end plates 312 may be integrally connected to the housing member 310 formed by integrally connecting the pair of side plates 313 and the bottom plate 314. The top cover 315 may be directly connected and fastened to the housing member 310 including the integrally connected the end plates 312, side plates 313 and bottom plate 314. The battery cells 10 constituting the battery module 300 may remain firmly fixed in the event of an impact, and regardless of the direction from which the impact is applied. Particularly, it may be possible to provide the battery module 300 having improved impact resistance by overcoming a structural weakness of a typical battery module, which may be weak against an impact applied in the z-axis direction perpendicular to the ground.

Hereinafter, a battery module according to still another embodiment will be described based on differences from the aforementioned embodiments with reference to FIGS. 7 and 8.

Figure 7:
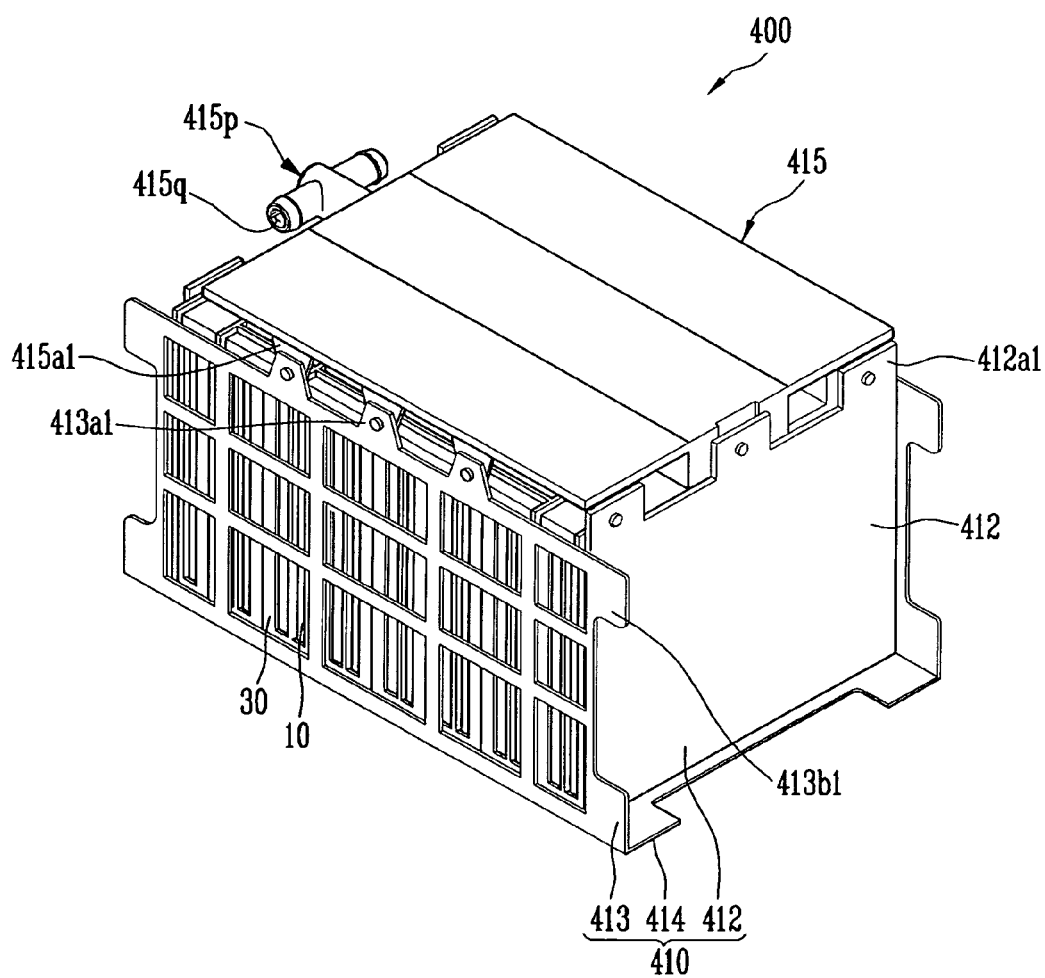
FIG. 7 illustrates a perspective view schematically showing a battery module according to still another embodiment.

FIG. 7 illustrates a perspective view schematically showing a battery module according to still another embodiment. FIG. 8 illustrates an exploded perspective view of FIG. 7.

Figure 8:
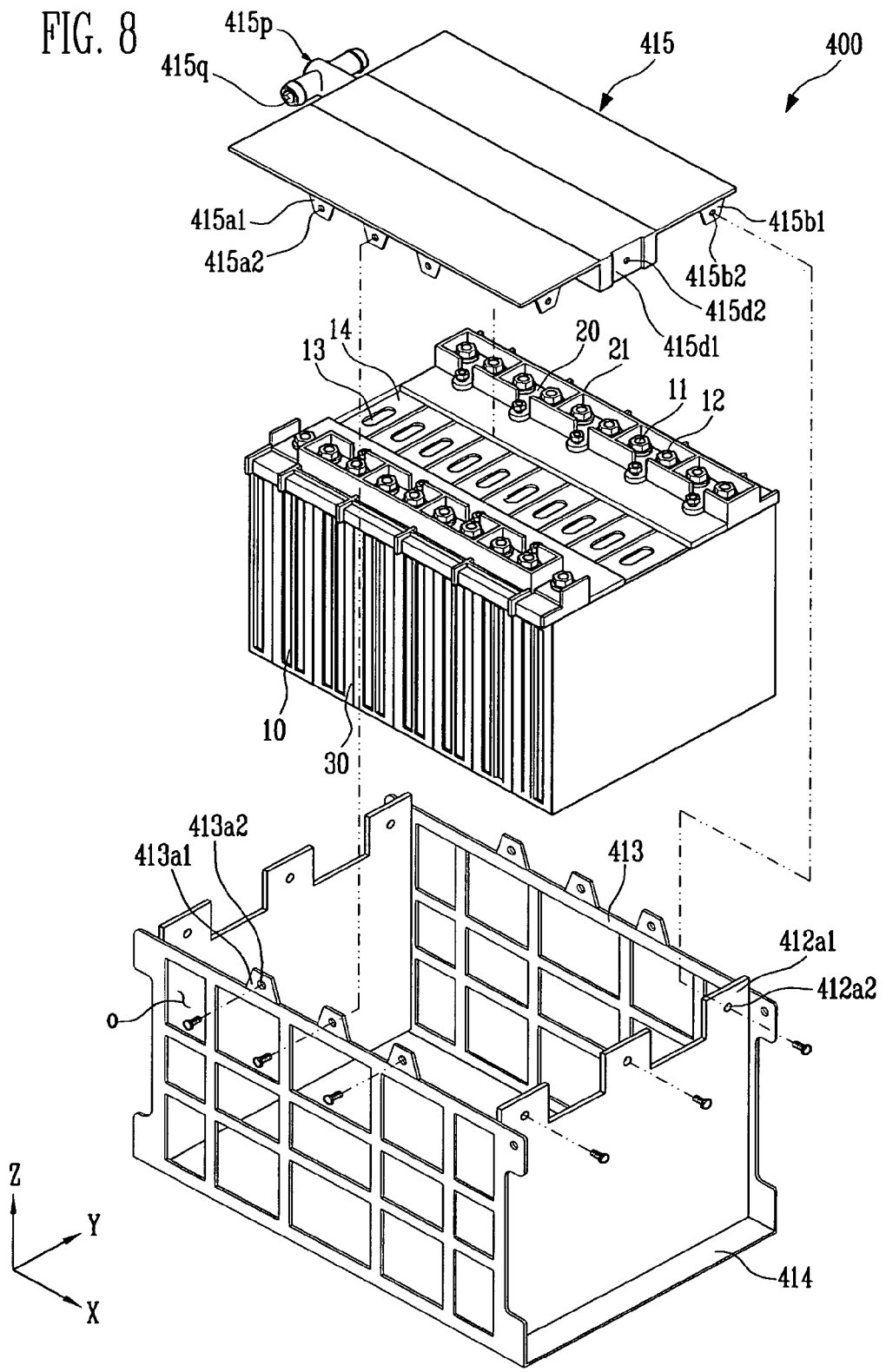
FIG. 8 illustrates an exploded perspective view of FIG. 7.

Referring to FIGS. 7 and 8, a housing member 410 according to this embodiment may include a pair of end plates 412 respectively disposed to come into surface contact with outermost battery cells 10 among the battery cells 10, and a pair of side plates 413 and a bottom plate 414 disposed between the pair of end plates 412. The pair of side plates 413 may be disposed between the pair of end plates 412 and may be integrally connected to the pair of end plates 412. The bottom plate 414 may be integrally connected to the pair of side plates 413 so as to face bottoms of the battery cells 10. It is to be understood that although the following descriptions may sometimes refer to a singular side plate 413 and a singular end plate 412 for convenience, such descriptions may apply to both of the pair of side plates 413 and both of the pair of end plates 412.

The side plate 413 may have at least one fastening portion 413a1 fastened to a top cover 415. The side plate 413 also may have a fastening hole 413a2 formed in the fastening portion 413a1. The side plates 413 may be integrally connected to the end plates 412 and the bottom plate 414. Separate fastening portions and fastening holes of the side plate 413 connected to the end plates 414 and the bottom plate 414 may be omitted.

The bottom plate 414 may be integrally connected to the side plates 413 and the end plates 412. Separate fastening portions and fastening holes may be omitted.

The top cover 415 may have at least one first fastening portion 415a1 fastened to the side plate 413, and at least one second fastening portion 415b1 fastened to the end plate 412. The top cover 415 also may have first and second fastening holes 415a2 and 415b2 respectively formed in the first and second portions 415a1 and 415b1. The top cover 415 may have a degassing portion 415d formed in a region corresponding to a vent region. The degassing portion 415d may act as an exhaustion path of gas generated from the inside of the battery cells 10. The degassing portion 415d may have at least one fastening portion 415d1 fastening to the end plate 412. The degassing portion 415d also may have a fastening hole 415d2 formed in the degassing fastening portion 415d1.

The degassing portion 415d may be fixed to be adhered closely to the vent region or fixed to be adhered closely to a top of an insulation member when the insulation member such as a gasket is positioned at an upper portion of the vent region. Thus, the degassing portion 415d may form an exhaustion path for gas generated from the battery cells 10, through which the gas may be safely leaked in one direction. A protruded exhaustion portion 415p may be provided to an outer side of the degassing portion 415d so that the gas generated from the battery cells 10 may be safely exhausted to the outside of the battery module 400 through the exhaustion portion 415p. For example, the exhaustion portion 415p may be T-shaped. Since the gas exhausted through the exhaustion portion 415p may have a bad influence on the battery module 400 or battery cell 10 adjacent to the exhaustion portion 415, it is desirable that the gas does not move to the adjacent battery module 400 or battery cell 10. The gas may be safely exhausted to left and right sides in parallel to the end plates 412, as described below, through external exhaustion holes 415q respectively formed at both ends of the T-shaped exhaustion portion 415p. In this embodiment, the T-shaped exhaustion portion 415p has been described as an example. However, the exhaustion portion 415p may be implemented in various shapes.

The end plate 412 may have at least one fastening portion 412a1 fastened to the top cover 415. The end plate 412 also may have a fastening hole 412a2 formed in the fastening portion 412a1. The end plates 412 may be integrally connected to the side plates 413 and the bottom plate 414. Separate fastening portions and fastening holes of the end plates 412 connected to the side plates 413 and the bottom plate 414 may be omitted.

In this embodiment, all the fastening portions 413a1, 415a1, 415b1 and 412a1 and the fastening holes 413a2, 415a2, 415b2 and 412a2 may be fastened by fastening members such as bolts-nuts or studs. If desired, all the fastening portions and holes may be fastened through welding.

An opening may be provided to the side plate 413 so as to act as a path for cooling the battery cells 10.

In the battery module 400 according to this embodiment, the degassing portion 415d may be directly fastened to the housing member 310 formed by integrally connecting the pair of side plates 413 and the bottom plate 414. The battery cells 10 constituting the battery module 400 may remain firmly fixed in the event of an impact, regardless of the direction from which the impact is applied. Particularly, it may be possible to provide the battery module 400 having improved impact resistance by overcoming a structural weakness of a typical battery module, which may be weak against an impact applied in the z-axis direction perpendicular to the ground.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
one or more battery cells aligned in one direction along an x-axis;
a housing member that accommodates the battery cells, and is adjacent to a whole of at least one surface of the battery cells; and
a top cover that is connected and fastened to at least one portion of the housing member, and covers tops of the battery cells;
wherein the housing member includes:
a pair of end plates respectively in surface contact with outermost battery cells among the battery cells,
a pair of side plates between the pair of end plates; and
a bottom plate between the pair of side plates and facing bottoms of the battery cells;
wherein the side plates and the bottom plate form externally projecting flanges together with the end plates, the externally projecting flanges extending parallel to the x-axis,
wherein the top cover includes at least one first fastening portion fastened to at least one of the pair of side plates, and at least one second fastening portion fastened to at least one of the pair of end plates, the first and second fastening portions of the top cover being flanges extending downwardly from sides of the top cover along a z-axis perpendicular to the x-axis,
wherein at least one of the pair of end plates includes at least one first fastening portion fastened to the at least one second fastening portion of the top cover, the first fastening portion of the pair of end plates being flanges extending upwardly along the z-axis from at least one side of the pair of end plates, and
wherein at least one of the pair of side plates includes at least one first fastening portion fastened to the at least one first fastening portion of the top cover, the first fastening portion of the pair of side plates being flanges extending upwardly along the z-axis from at least one side of the pair of side plates.

2. The battery module as claimed in claim 1, wherein the battery cells are prismatic.

3. The battery module as claimed in claim 2, wherein at least one of the pair of side plates includes, at least one second fastening portion fastened to at least one of the pair of end plates, and at least one third fastening portion fastened to the bottom plate.

4. The battery module as claimed in claim 3, wherein the at least one of the pair of side plates includes first, second and third fastening holes respectively located in the first, second and third fastening portions.

5. The battery module as claimed in claim 2, wherein the bottom plate includes at least one first fastening portion fastened to at least one of the pair of side plates, and at least one second fastening portion fastened to at least one of the pair of end plates.

6. The battery module as claimed in claim 5, wherein the bottom plate includes first and second fastening holes respectively located in the first and second fastening portions.

7. The battery module as claimed in claim 1, wherein the top cover includes first and second fastening holes respectively located in the first and second fastening portions.

8. The battery module as claimed in claim 2, wherein at least one of the pair of end plates includes at least one second fastening portion fastened to at least one of the pair of side plates, and at least one third fastening portion fastened to the bottom plate.

9. The battery module as claimed in claim 8, wherein the at least one of the pair of end plates includes first, second and third fastening holes respectively located in the first, second and third fastening portions.

10. The battery module as claimed in claim 2, wherein the pair of side plates and the bottom plate are integrally formed.

11. The battery module as claimed in claim 2, wherein the pair of side plates, the bottom plate, and the pair of end plates are integrally formed.

12. The battery module as claimed in claim 2, wherein a degassing portion corresponding to vent regions of the battery cells is further provided at a position corresponding to at least one portion of the top cover.

13. The battery module as claimed in claim 12, wherein the top cover includes at least one degassing fastening portion fastened to the degassing portion.

14. The battery module as claimed in claim 13, wherein the top cover includes a first fastening hole, a second fastening hole and a degassing fastening hole, respectively formed in the first fastening portion, the second fastening portion and the degassing fastening portion.

15. The battery module as claimed in claim 12, wherein the at least one of the pair of end plates includes a fastening hole formed in the fastening portion.

16. The battery module as claimed in claim 2, wherein the pair of side plates, the bottom plate, the top cover and the pair of end plates forming the housing member are fastened with fastening members or through welding.

17. The battery module as claimed in claim 16, wherein the fastening members are bolt nuts or studs.

18. The battery module as claimed in claim 2, wherein at least one opening is provided to the side plate.

* * * * *